(12) United States Patent
Warren, Jr. et al.

(10) Patent No.: US 8,546,719 B2
(45) Date of Patent: Oct. 1, 2013

(54) METHOD AND PLASMA ARC TORCH SYSTEM FOR MARKING AND CUTTING WORKPIECES WITH THE SAME SET OF CONSUMABLES

(75) Inventors: Joseph V. Warren, Jr., Florence, SC (US); Koustubh Dnyandeo Ashtekar, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 498 days.

(21) Appl. No.: 12/928,464

(22) Filed: Dec. 13, 2010

(65) Prior Publication Data
US 2012/0145680 A1 Jun. 14, 2012

(51) Int. Cl.
*B23K 10/00* (2006.01)
(52) U.S. Cl.
USPC ............ 219/121.44; 219/121.39; 219/121.37; 219/121.5; 219/75; 219/121.51; 313/231.51; 315/111.21
(58) Field of Classification Search
CPC ....................................................... B23K 10/00
USPC ........... 219/121, 45, 121.39, 121.59, 121.55, 219/121.54; 313/231.41
See application file for complete search history.

(56) References Cited

U.S. PATENT DOCUMENTS

| | | | | |
|---|---|---|---|---|
| 5,445,324 | A | * | 8/1995 | Berry et al. ..................... 239/99 |
| 5,906,757 | A | * | 5/1999 | Kong et al. ............. 219/121.47 |
| 6,001,426 | A | * | 12/1999 | Witherspoon et al. ........ 427/449 |
| 6,998,566 | B2 | * | 2/2006 | Conway et al. ........... 219/121.52 |
| 8,089,025 | B2 | * | 1/2012 | Sanders .................... 219/121.49 |
| 8,389,887 | B2 | * | 3/2013 | Liebold et al. ............. 219/121.5 |

\* cited by examiner

*Primary Examiner* — Mark Paschall
(74) *Attorney, Agent, or Firm* — Kacvinsky Daisak PLLC

(57) ABSTRACT

A plasma arc torch both cutting and marking of metal workpieces includes a plasma nozzle having a plasma nozzle orifice through which an electric arc from an electrode and a stream of plasma gas are emitted toward a workpiece, and a liquid-injection shield cup that injects liquid tangentially inwardly to the arc and stream of plasma gas. A power supply is operable to selectively deliver electrical power to the electrode at either a low power level suitable for marking of a workpiece or a high power level suitable for workpiece cutting. The torch may be selectively operated to mark at the low power level, with a plasma marking gas being delivered to the plasma gas passage, or to cut at the high power level, with a plasma cutting gas being delivered to the plasma gas passage, and liquid being delivered to the liquid injection passage for both cutting and marking.

16 Claims, 8 Drawing Sheets
(1 of 8 Drawing Sheet(s) Filed in Color)

METHOD AND PLASMA ARC TORCH SYSTEM FOR MARKING AND CUTTING WORKPIECES WITH THE SAME SET OF CONSUMABLES

BACKGROUND OF THE INVENTION

The present application generally relates to plasma arc torch systems, and more particularly relates to a plasma arc torch system having the capability both to cut (i.e., sever or divide into multiple pieces) and to mark (i.e., produce visible lines on the surface of) metal workpieces without having to change any of the consumables of the torch.

Dedicated plasma marking torches are commonly employed to mark metal plates and other workpieces with lines, numbers, or symbols to facilitate subsequent plate layout and assembly operations. Also, alpha-numeric markings are sometimes employed for plate identification purposes. Known marking torches usually operate at low amperage (e.g., about 8-10 amperes) and employ a non-cutting gas, such as argon, as the plasma gas, which forms a plasma stream that exits through the nozzle orifice and forms a visible mark on the workpiece. Known marking torches also typically include an air cooling system that circulates air into contact with the electrode and then along the outside surface of the plasma nozzle so as to be discharged coaxially about the plasma stream.

It would be desirable to have a plasma arc torch that is able to both mark and cut workpieces, and perform both tasks with high precision. The assignee of the present application has previously developed a plasma arc torch having both marking and cutting capabilities, as described in U.S. Pat. No. 6,054,669, the entire disclosure of which is incorporated herein by reference. The torch described in the '669 patent comprises a torch body defining a longitudinal axis, and an electrode mounted to the torch body along the longitudinal axis and defining a front discharge end. A nozzle is mounted on the torch body to overlie the front discharge end of the electrode and so as to define a plasma cavity therebetween, and the nozzle includes a front wall having a bore therethrough that is aligned with the electrode along the longitudinal axis. A shield is mounted to the torch body so as to overlie in spaced relation the front wall of the nozzle and define a gap therebetween, which gap forms an annular orifice that coaxially surrounds the bore of the nozzle. A plasma gas passage extends through the torch body and to the plasma cavity, and a plasma gas control is provided for delivering a plasma marking gas to the plasma gas passage and thus to the plasma cavity. Also, a shield gas passage extends through the torch body and to the annular gas orifice, and a shield gas control is provided for delivering a gas (optionally also containing a water mist) to the shield gas passage and thus to the annular gas orifice. A power supply is also provided for delivering electrical power to the electrode at a relatively low power level that is suitable for plasma marking of a workpiece.

The orifice of the nozzle for the above-described torch was quite small in diameter, on the order of 0.018 to 0.043 inch. Accordingly, the arc density even at the relatively low marking arc current level (10 to 35 amperes) was very high. This enabled the torch to form high-quality marks on carbon steel and stainless steel. However, in order to form such high-quality marks, the marking speed (i.e., linear speed of the torch, typically measured in inches per minute, or "ipm") had to be relatively low.

In some applications (e.g., marking of alignment marks on large plates such as for shipbuilding or the like), it is desired to be able to mark at much higher marking speeds. In order to be able to increase the marking speed with the above-described torch, it is necessary to increase the arc current. Alternatively, it was found that adding the optional water mist in the shield gas allowed a modest increase in marking speed without increasing the arc current. However, it was still not possible to mark at speeds exceeding about 300 ipm even when the water mist was employed, and the highest attainable speed for acceptable-quality alphanumeric marking was about 100 ipm.

BRIEF SUMMARY OF THE INVENTION

The present application describes a plasma arch torch system and method employing a substantially different approach from that of the above-described torch system and method. Cutting and marking can be performed without changing any consumables (electrode and nozzles) of the torch. With the presently described torch system, plasma nozzles with substantially larger-diameter orifices (e.g., 0.070 inch and larger) can be used, and yet high-quality, fine lines can be marked on workpieces such as stainless steel. Marking speeds as high as about 600 ipm can be achieved without substantial loss of marking quality. These counterintuitive results are made possible by virtue of the features of the torch system and method described hereinbelow.

In accordance with one embodiment disclosed herein, a method of operating a plasma arc torch to selectively cut, as well as form markings on surfaces of, metal workpieces, comprises the steps of:

(1) providing a plasma arc torch comprising
   (a) a torch body defining a longitudinal axis,
   (b) an electrode mounted to the torch body along the longitudinal axis and defining a front discharge end supporting an emissive element operable for emitting an electrical arc,
   (c) a plasma nozzle mounted on the torch body to overlie the front discharge end of the electrode and so as to define a plasma cavity therebetween, said plasma nozzle including a front wall having a plasma nozzle orifice extending therethrough and aligned with the electrode along the longitudinal axis, such that an arc emitted from the emissive element can pass through the plasma nozzle orifice along with a stream of plasma gas,
   (d) a liquid-injection shield cup mounted to the torch body so as to overlie in spaced relation the front wall of the plasma nozzle and define an annular liquid chamber between the liquid-injection shield cup and the plasma nozzle, the liquid-injection shield cup including a front wall having an axial liquid injection orifice extending therethrough and aligned with the electrode along the longitudinal axis such that the arc and stream of plasma gas issuing from the plasma nozzle orifice pass through the axial liquid injection orifice and toward a workpiece adjacent the front wall of the liquid-injection shield cup, the liquid-injection shield cup and the plasma nozzle being structured and arranged so as to cooperatively define a tangential liquid injection orifice that is generally annular and coaxially surrounds the arc and stream of plasma gas issuing from the plasma nozzle orifice of the plasma nozzle and injects liquid from the annular liquid chamber tangentially inwardly to the arc and stream of plasma gas and then through the axial liquid injection orifice toward the workpiece,
   (e) a plasma gas passage extending through the torch body and to the plasma cavity, and
   (f) a liquid injection passage extending through the torch body and to the annular liquid chamber;

(2) marking the workpiece by delivering a plasma marking gas to the plasma gas passage and thus to the plasma cavity, delivering liquid to the liquid injection passage and thus to the annular liquid chamber, and delivering electrical power to the electrode at a relatively low power level that is suitable for plasma marking of the workpiece, such that a relatively low-current arc is directed, along with a stream of plasma marking gas and the liquid, out from the axial liquid injection orifice toward the workpiece; and (3) cutting the workpiece, or another workpiece, by delivering a plasma cutting gas to the plasma gas passage and thus to the plasma cavity, delivering liquid (e.g., water, or water with one or more additives) to the liquid injection passage and thus to the annular liquid chamber, and delivering electrical power to the electrode at a relatively high power level that is suitable for plasma cutting of the workpiece, such that a relatively high-current arc is directed, along with a stream of plasma cutting gas and the liquid, out from the axial liquid injection orifice toward the workpiece.

In at least the marking mode of operation, liquid is supplied to the liquid injection passage of the torch at a controlled flow rate that is selectively variable over a range from about 0.1 to about 1.0 gallons per minute (gpm). Higher or lower liquid flow rates may be employed in the cutting mode, if desired.

In a particular embodiment, a gas of a first composition is delivered to the plasma gas passage for marking, and a gas of a second composition different from the first composition is delivered to the plasma gas passage for cutting.

The method can entail delivering electrical current not greater than about 50 amperes the electrode for marking, and delivering electrical current greater than that used for marking to the electrode for cutting.

In one embodiment, the liquid is injected by the tangential liquid injection orifice inwardly to the arc and stream of plasma gas along a direction substantially perpendicular to the longitudinal axis, by virtue of the configuration of the plasma nozzle and the liquid-injection shield cup.

In another embodiment, the liquid is injected by the tangential liquid injection orifice inwardly to the arc and stream of plasma gas along a direction oblique to the longitudinal axis so as to form a cone of injection liquid directed inwardly, by virtue of the configuration of the plasma nozzle and the liquid-injection shield cup. The cone can have a half angle of approximately 1° to 80°.

In accordance with one aspect of the torch system disclosed herein, the system can include multiple alternative sets of plasma nozzles and liquid-injection shield cups. Each set, comprising a plasma nozzle and corresponding liquid-injection shield cup, can be configured for a particular range of cutting arc current. Thus, in one embodiment, a first set of plasma nozzle and liquid-injection shield cup is used to mark a workpiece at an arc current less than or equal to about 50 amperes and to cut the workpiece, or another workpiece, at an arc current equal to or greater than about 70 amperes but less than 200 amperes. The method can then include the step of replacing the first set of plasma nozzle and liquid-injection shield cup with a differently configured second plasma nozzle and a differently configured second liquid-injection shield cup, and marking a workpiece at an arc current less than or equal to about 50 amperes and cutting the workpiece, or another workpiece, at an arc current equal to or greater than 200 amperes but less than 300 amperes.

The method can further include the step of replacing the second plasma nozzle and the second liquid-injection shield cup with a still differently configured third plasma nozzle and a still differently configured third liquid-injection shield cup, and marking a workpiece at an arc current less than or equal to about 50 amperes and cutting the workpiece, or another workpiece, at an arc current equal to or greater than 300 amperes.

The present application further describes a plasma arc torch system for both cutting and marking of metal workpieces. In one embodiment, the system comprises a torch body, electrode, plasma nozzle, and liquid-injection shield cup as described above. A plasma gas passage is defined for supplying either marking or cutting gas to the plasma gas chamber, and a liquid injection passage is defined for supplying liquid to the liquid chamber. The system further comprises an injection liquid control for supplying a flow of liquid at a regulated volumetric flow rate to the liquid injection passage and thus to the liquid chamber, the injection liquid control being operable to selectively vary the regulated volumetric flow rate of the liquid. Additionally, the system includes a power supply operable to selectively deliver electrical power to the electrode at either (1) a relatively low power level that is suitable for plasma marking of a workpiece or (2) a relatively high power level that is suitable for workpiece cutting.

Accordingly, the torch may be selectively operated (1) at the relatively low power level, with a plasma marking gas being delivered to the plasma gas passage, and liquid being delivered to the liquid injection passage, to permit operation in a workpiece marking mode, or (2) at the relatively high power level, with a plasma cutting gas being delivered to the plasma gas passage, and liquid being delivered to the liquid injection passage, to permit operation in a workpiece cutting mode.

The system can further include a gas control operable for selectively delivering either a plasma marking gas or a plasma cutting gas to the plasma gas passage, for either marking or cutting, respectively.

A further advantage of the wet marking method and torch system in accordance with the invention is a substantially increased standoff distance (measured as the shortest distance from the end of the torch to the surface of the workpiece) relative to the standoff distance required with dry marking torches and processes. In particular, the standoff distance during wet marking in accordance with the invention can be between about 0.2 and 0.3 inch, whereas a typical standoff distance during dry marking is significantly less than 0.1 inch (e.g., as small as 0.015 inch). This means that collision between the torch and workpiece is substantially less likely to occur with the wet marking method and torch system of the invention, relative to prior dry marking methods and systems.

The plasma nozzle and liquid-injection shield cup can be variously configured for the particular usage they are designed to meet. As one example, the front wall of the plasma nozzle and the front wall of the liquid-injection shield cup can be configured so as to define the tangential liquid injection orifice as a generally conical orifice that injects a cone of liquid inwardly to the arc and stream of plasma gas along a direction oblique to the longitudinal axis. The tangential liquid injection orifice can be configured such that the cone of liquid has a cone half angle of about 1° to 80°. Cone half angles greater than 80° are considered to provide "generally perpendicular" injection of liquid inwardly to the arc and stream of plasma gas, as opposed to "oblique" injection of liquid. Nozzles configured to inject liquid obliquely may be suitable, for example, for cutting at relatively low arc currents (e.g., about 70 to about 250 amperes).

As another example, in the region of the tangential liquid injection orifice the front wall of the plasma nozzle and the front wall of the liquid-injection shield cup can extend radially inwardly along a direction generally perpendicular to the longitudinal axis such that the liquid is injected inwardly to the arc and stream of plasma gas along a direction generally perpendicular to the longitudinal axis. Nozzles configured to inject liquid generally perpendicularly may be suitable, for example, for cutting at relatively higher arc currents (e.g., above about 250 amperes).

The plasma arc torch system can include a plurality of sets of plasma nozzles and liquid-injection shield cups, where a "set" comprises a plasma nozzle and a corresponding liquid-injection shield cup configured specifically to be used with the plasma nozzle. For example, the plurality of sets can be graduated in terms of the levels of cutting arc current at which they are respectively designed to operate. Thus, for instance, a first set of nozzle/shield cup can be characterized as having a plasma nozzle orifice of the plasma nozzle that is relatively small in diameter, suitable for cutting at a relatively low first range of arc current. The system can include a second set of nozzle/shield cup configured to be installed in the plasma arc torch system in replacement of the plasma nozzle and the liquid-injection shield cup, wherein the second plasma nozzle has a plasma nozzle orifice larger in diameter than the plasma nozzle orifice of the plasma nozzle. Thus, the second plasma nozzle and the second liquid-injection shield cup can be suitable for cutting at a second range of arc current that is higher than the first range of arc current.

If desired, the system can include at least a third plasma nozzle and a third liquid-injection shield cup configured to be installed in the plasma arc torch system in replacement of the plasma nozzle and the liquid-injection shield cup, wherein the third plasma nozzle has a plasma nozzle orifice larger in diameter than the plasma nozzle orifice of the second plasma nozzle, the third plasma nozzle and the third liquid-injection shield cup being suitable for cutting at a third range of arc current that is higher than the second range of arc current;

Although the various sets of nozzles and shield cups are designed for cutting at different arc current levels, all of the sets enable the plasma arc torch system to mark a workpiece. The arc current for marking with each set is lower than the first (lowest) range of arc current for cutting, and is generally lower than about 50 amperes.

One or more of the nozzle/cup sets can include a swirl ring disposed in a generally annular space defined between the plasma nozzle and the liquid-injection shield cup. That generally annular space receives liquid from, or is a part of, the injection liquid supply passage. The swirl ring imparts swirl to the liquid before it is injected inwardly to the plasma plume.

An insulator/spacer can be disposed between the plasma nozzle and the liquid-injection shield cup for electrically isolating the plasma nozzle from the liquid-injection shield cup.

While not wishing to be bound by any particular hypothesis, the assignee theorizes that the radially inward injection of liquid into the arc and stream of plasma gas results in a "squeezing" of the arc that stabilizes the arc and thereby results in a more-distinct or clean (as opposed to "fuzzy") line being marked on the workpiece. As applied to stainless steel workpieces, relative to the lines marked by the above-described prior torch developed by the assignee, the lines marked by the present torch system and method surprisingly have a smaller line width, darker line color (and therefore higher contrast with the original metal surface), and reduced surface roughness, even when the plasma nozzle orifice diameter is substantially larger than that of the prior torch.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Having thus described the invention in general terms, reference will now be made to the accompanying drawings, which are not necessarily drawn to scale, and wherein:

Figure 7:
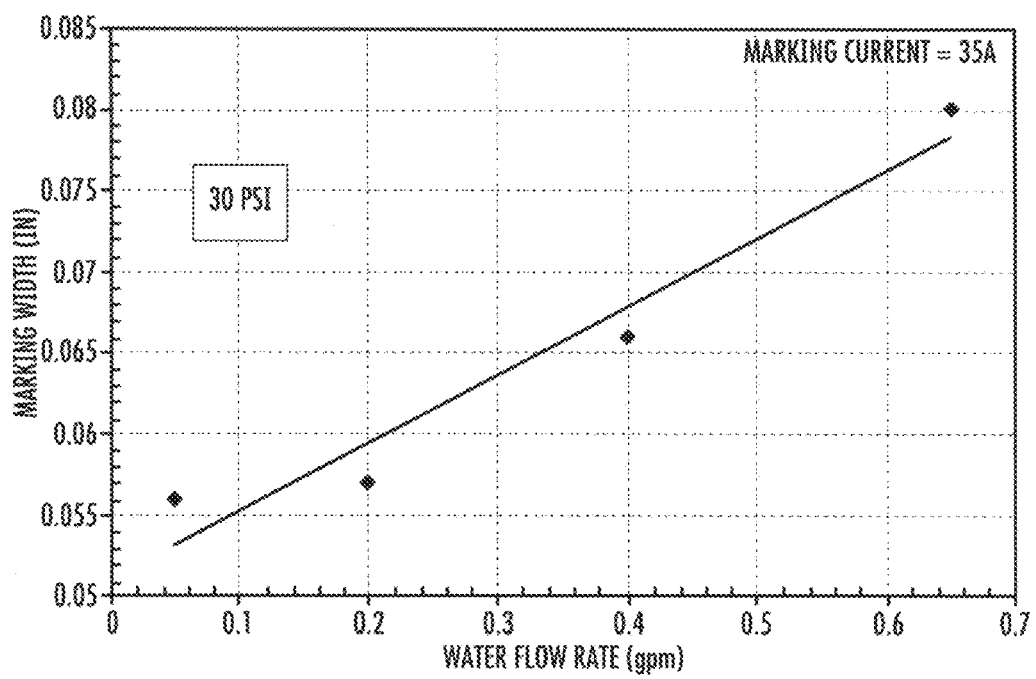
Figure 8:
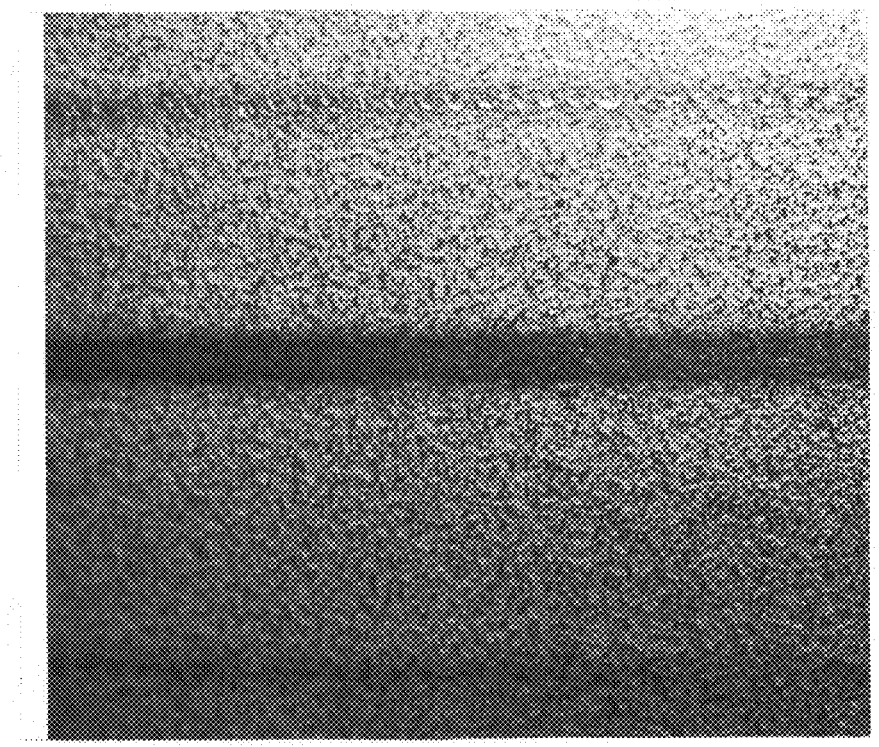

FIG. 7 is a graph showing test results of a plasma arc torch in accordance with an embodiment of the present invention, using a nozzle assembly designed for cutting at 400 amperes of arc current, depicting how marking line width varied as a function of liquid flow rate; and FIG. 8 is a magnified color photograph of a two-line mark produced by a wet-marking process in accordance with an embodiment of the invention.

DETAILED DESCRIPTION OF THE DRAWINGS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A plasma arc torch 10 in accordance with one embodiment of the present invention is shown in FIGS. 1A through 1D, which depict cross-sections of the torch along two different planes angularly offset from each other in order to show features that appear in one cross-section but not the other. The torch includes a generally cylindrical main torch body 14 generally made of a conductive material such as metal, a generally cylindrical lower or front insulator body 16 connected to the main torch body 14, an electrode holder assembly 18 extending through a central bore of the main torch body 14 and through a central bore of the front insulator body 16, an electrode 20 connected to a free end of the electrode holder assembly 18, and a nozzle assembly 22 connected to the insulator body 16 adjacent the electrode 20.

The torch includes a plasma gas supply tube 24 secured within a plasma gas supply passage 26 defined in the main torch body 14. The plasma gas passage 26 extends through the main torch body 14 to a lower end face thereof. The insulator body 16 has an upper end face that abuts the lower end face of the main torch body. The insulator body 16 defines a plasma gas passage 36 that is aligned with and connected to the plasma gas passage 26 in the main torch body 14. Thus, a plasma gas, such as oxygen, air, nitrogen, H-35, F5, or argon, is supplied through the plasma gas supply tube 24 into the plasma gas supply passage 26 in the torch body, and thence into the corresponding passage 36 in the insulator body 16. The plasma gas passage 36 extends through the insulator body 16 from its upper end face into a cylindrical counterbore 38 in the lower end of the insulator body 16. As further described below, the counterbore 38, together with the upper end of the nozzle assembly 22, forms a plasma gas supply chamber 40 from which plasma gas is supplied to a primary or plasma gas nozzle of the torch. Plasma gas from a suitable source enters the plasma gas supply chamber 40 by flowing through the plasma gas passage 26 in the main torch body 14, into the plasma gas passage 36 of the insulator body 16 aligned with the passage 26, and into the chamber 40.

The nozzle assembly 22 includes a plasma nozzle 42 (alternatively known as a "base") that has a generally cylindrical upper portion slidingly received within a metal insert sleeve 44 that is inserted into the counterbore 38 of the insulator body 16. An O-ring (not shown) seals the sliding interconnection between the plasma nozzle 42 and the metal insert sleeve 44. The plasma nozzle includes a plasma nozzle orifice 50 at the tip end thereof. A liquid-injection shield cup 48 (alternatively known as a "shell") coaxially surrounds the plasma nozzle 42 and includes an axial liquid injection orifice 51 at its tip end. A plasma gas flow path exists from the plasma gas supply chamber 40 through a central passage of the plasma nozzle 42 into a plasma cavity 43 defined between the plasma nozzle 42 and the electrode 20. From the plasma cavity 43 the plasma gas flows through the plasma nozzle orifice 50 and axial liquid injection orifice 51 for directing a jet of plasma gas to aid in performing a cutting or marking operation on a workpiece. An arc emanating from the electrode 20 also passes through the orifices 50, 51 toward the workpiece, as further described below.

The plasma gas jet preferably has a swirl component created by a hollow cylindrical ceramic gas baffle 52 partially disposed in a counterbore recess 54 of the insulator body 16. A lower end of the baffle 52 abuts an annular flange face of the plasma nozzle 42. An outer surface of the baffle 52 is surrounded by the generally annular chamber 40. The baffle 52 has non-radial holes for directing plasma gas from the chamber 40 into the central passageway of the plasma nozzle 42 with a swirl component of velocity.

The torch 10 includes a tubular shield retainer holder 78 whose upper end is internally threaded and screws onto an externally threaded portion of a torch outer housing 82 that surrounds the main torch body 14, with insulation 84 disposed between the torch body 14 and the outer housing 82. The shield retainer holder 78 has a lower end portion that is externally threaded for attaching to an internally threaded shield retainer 96. A lower end portion of the shield retainer 96 is generally frustoconical and defines a radially inwardly projecting flange 97 having an upper surface that engages a lower surface of a radially outwardly projecting flange of the liquid-injection shield cup 48. Thus, the nozzle assembly 22 is retained in the torch by the shield retainer 96.

The torch includes an injection liquid supply tube 30 secured within an injection liquid supply passage 32 defined in the main torch body 14. The injection liquid supply passage 32 extends through the main torch body 14 to its lower end face for supplying liquid to a corresponding liquid injection passage 72 in the insulator body 16. The liquid injection passage 72 extends into the insulator body 16 and then angles outwardly and extends through the cylindrical outer surface of the insulator body, into a generally annular space 73 defined between the insulator body 16 and the shield retainer holder 78. The insulating sleeve 80 has a plurality of circumferentially spaced axial grooves 79 in its radially outer surface, and liquid flows from the annular space 73 through the grooves 79 into a generally annular space between the shield retainer 96 and the liquid-injection shield cup 48. The liquid-injection shield cup 48 defines a series of circumferentially spaced holes 100 that supply the injection liquid from that generally annular space into a liquid chamber 102 defined between the liquid-injection shield cup 48 and the plasma nozzle 42. The liquid chamber 102 is an upper end portion of a generally annular space between the two nozzles 42 and 48, and a swirl ring 110 is disposed in a lower end portion of that annular space. Liquid flows from the liquid chamber 102 through tangentially directed holes in the swirl ring 110 into a further liquid chamber 112 defined as a generally annular space between a lower end portion of the liquid-injection shield cup 48 and a lower end portion of the plasma nozzle 42. The swirling flow of liquid in the liquid chamber 112 is then injected through a tangential liquid injection orifice 114 (defined between the front wall of the plasma nozzle 42 and the front wall of the liquid-injection shield cup 48) inwardly to the arc and stream of plasma gas passing through the orifices 50, 51. In the illustrated embodiment, the tangential liquid injection orifice 114 is configured to inject the liquid generally perpendicular to the longitudinal axis along which the arc and stream of plasma gas extend. However, in other embodiments, such as those described further below, the tangential liquid injection orifice can be configured to inject the liquid obliquely relative to the longitudinal axis.

The electrode holder assembly 18 includes an upper tubular electrode holder 56 that has its upper end connected by screw threads within a blind axial bore 58 in the main torch body 14. The upper electrode holder 56 extends into an axial bore 60 formed through the insulator body 16, and the lower end of the electrode holder 56 includes an enlarged internally screw-threaded coupler 62 that has an outer diameter slightly smaller than the inner diameter of the ceramic gas baffle 52 that is sleeved over the outside of the coupler 62. The electrode holder assembly also includes internal screw threads spaced above the coupler 62 for threadingly receiving a lower tube 64 that supplies coolant to the electrode 20, as further described below, and which extends outward from the axial bore of the insulator body 16 into the central passage of the plasma nozzle 42. The electrode 20 comprises a cup-shaped body whose open upper end is threaded by screw threads into the coupler 62 at the lower end of the electrode holder 56, and whose capped lower end is closely adjacent the lower end of the lower coolant tube 64.

A coolant circulating space exists between the inner wall of the electrode 20 and the outer wall of the coolant tube 64, and between the outer wall of the coolant tube 64 and the inner wall of the electrode holder 56. The electrode holder 56 includes a plurality of holes 66 for supplying coolant from the space within the electrode holder to a space 68 between the electrode holder and the inner wall of the axial bore 60 in the insulator body 16. A seal 69 located between the holes 66 and the coupler 62 seals against the inner wall of the bore 60 to prevent coolant in the space 68 from flowing past the seal 69 toward the coupler 62. A raised annular rib or dam 71 on the outer surface of the electrode holder 56 is located on the other side of the holes 66 from the seal 69, for reasons that will be made apparent below.

The torch 10 includes a coolant inlet connector tube 111 that is secured within a coolant inlet passage 113 in the main torch body 14. The coolant inlet passage 113 connects to the center axial bore 58 in the main torch body. Coolant is thus supplied into the bore 58 and thence into the internal passage through the electrode holder 56, through the internal passage of the coolant tube 64, and into the space between the tube 64 and the electrode 20. Heat is transferred to the liquid coolant from the lower end of the electrode (from which the arc emanates) and the coolant then flows through a passage between the lower end of the coolant tube 64 and the electrode 20 and upwardly through the annular space between the coolant tube 64 and the electrode 20, and then into the annular space 68 between the coolant tube 64 and the electrode holder 18.

A coolant supply passage 70 extends through the insulator body 16 from the space 68 through the outer cylindrical surface of the insulator body 16 for supplying coolant to the nozzle assembly 22. The insulator body 16 includes a groove or flattened portion 116 that permits coolant to flow from the passage 70 between the insulator body 16 and an insulating sleeve 80 that surrounds the insulator body 16 as well as the upper end portion of the nozzle assembly 22, and into a coolant chamber 118 that surrounds the upper nozzle member 42. The coolant flows around the upper nozzle member 42 to cool the nozzle assembly.

Coolant is returned from the nozzle assembly via a second groove or flattened portion 120 angularly displaced from the portion 116, and into a coolant return passage 122 in the insulator body 16. The coolant return passage 122 extends into a portion of the axial bore 60 that is separated from the coolant supply passage 70 by the dam 71. The coolant then flows between the electrode holder 56 and the inner wall of the bore 60 into an annular space 126 that is connected with a coolant return passage 128 formed in the main torch body 14, and out the coolant return passage 128 via a coolant return connector tube 130 secured therein. Typically, returned coolant is recirculated in a closed loop back to the torch after being cooled.

During starting of the torch 10, a difference in electrical voltage potential is established between the electrode 20 and the plasma nozzle 42 so that an electric arc forms across the gap therebetween. Plasma gas is then flowed through the nozzle assembly 22 and the electric arc is blown outward from the plasma nozzle orifice 50 and axial liquid injection orifice 51 until it attaches to a workpiece, at which point the plasma nozzle 42 is disconnected from the electric source so that the arc exists between the electrode 20 and the workpiece. The torch is then in a working mode of operation.

Figure 1A:
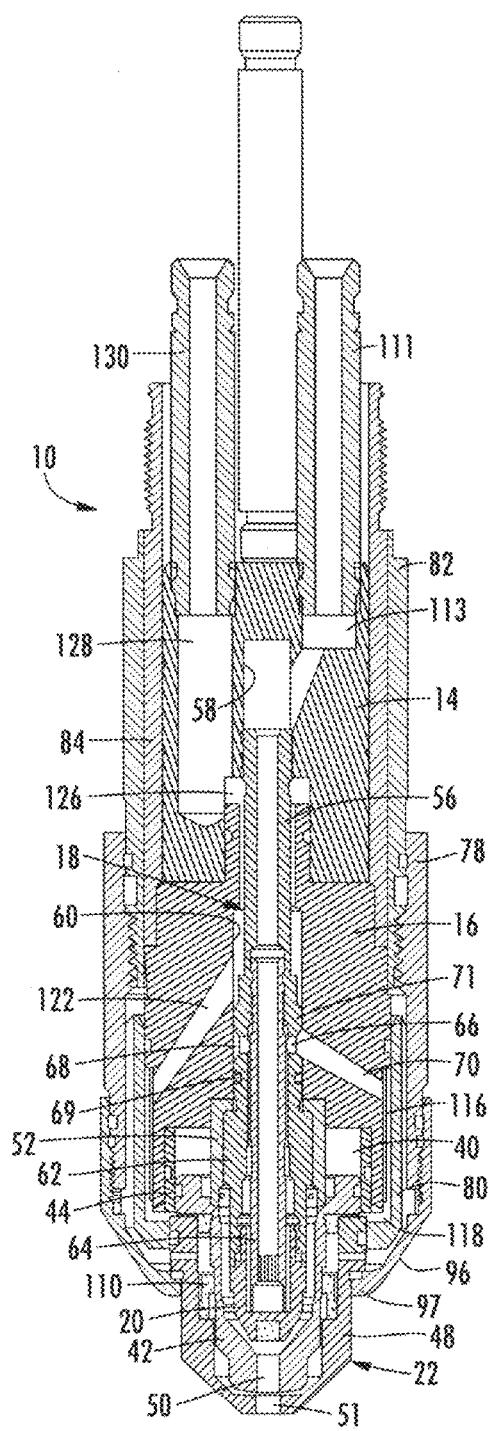
FIG. 1A is an axially sectioned side view of a plasma arc torch in accordance with one embodiment of the invention.
Figure 1B:
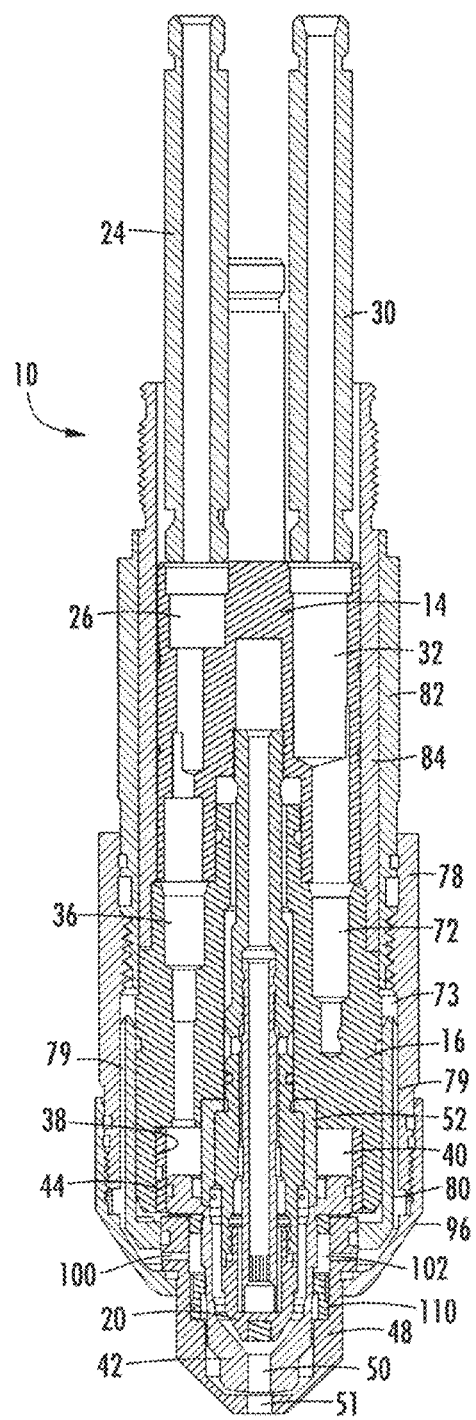
FIG. 1B is an axially sectioned view of the torch of FIG. 1A, sectioned along a plane angularly offset from the plane of FIG. 1A.
Figure 1C:
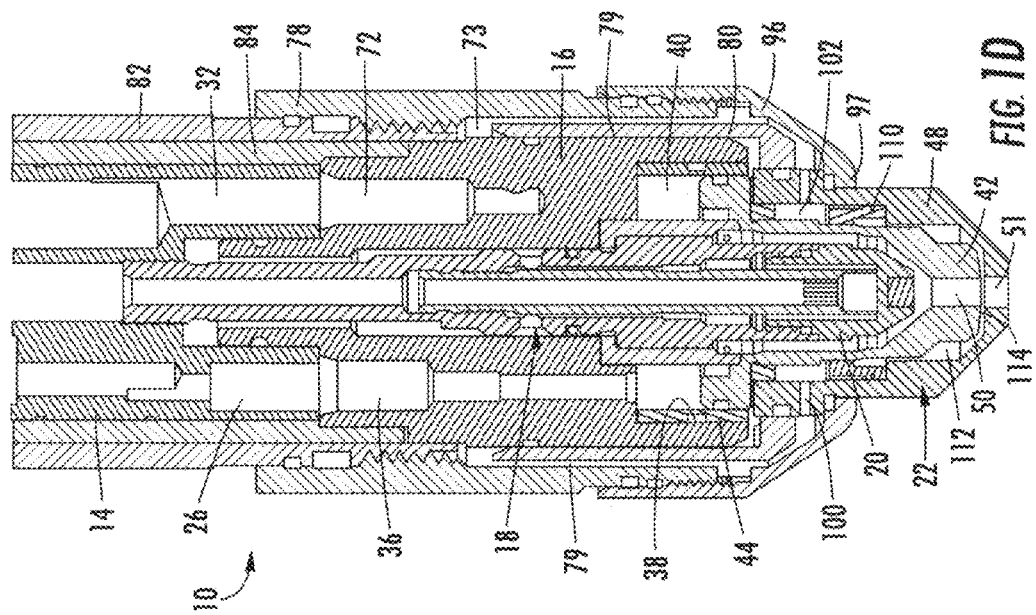
FIG. 1C is a view similar to FIG. 1A, but somewhat enlarged in scale to better show details of torch components.
Figure 1D:
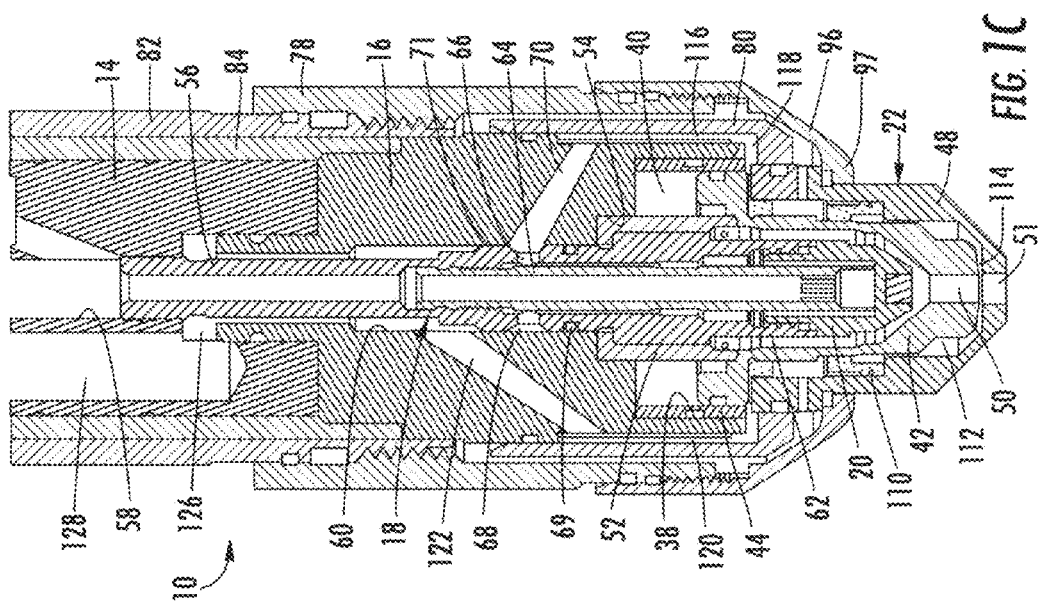
FIG. 1D is a view similar to FIG. 1B, but somewhat enlarged in scale to better show details of torch components.
Figure 2:
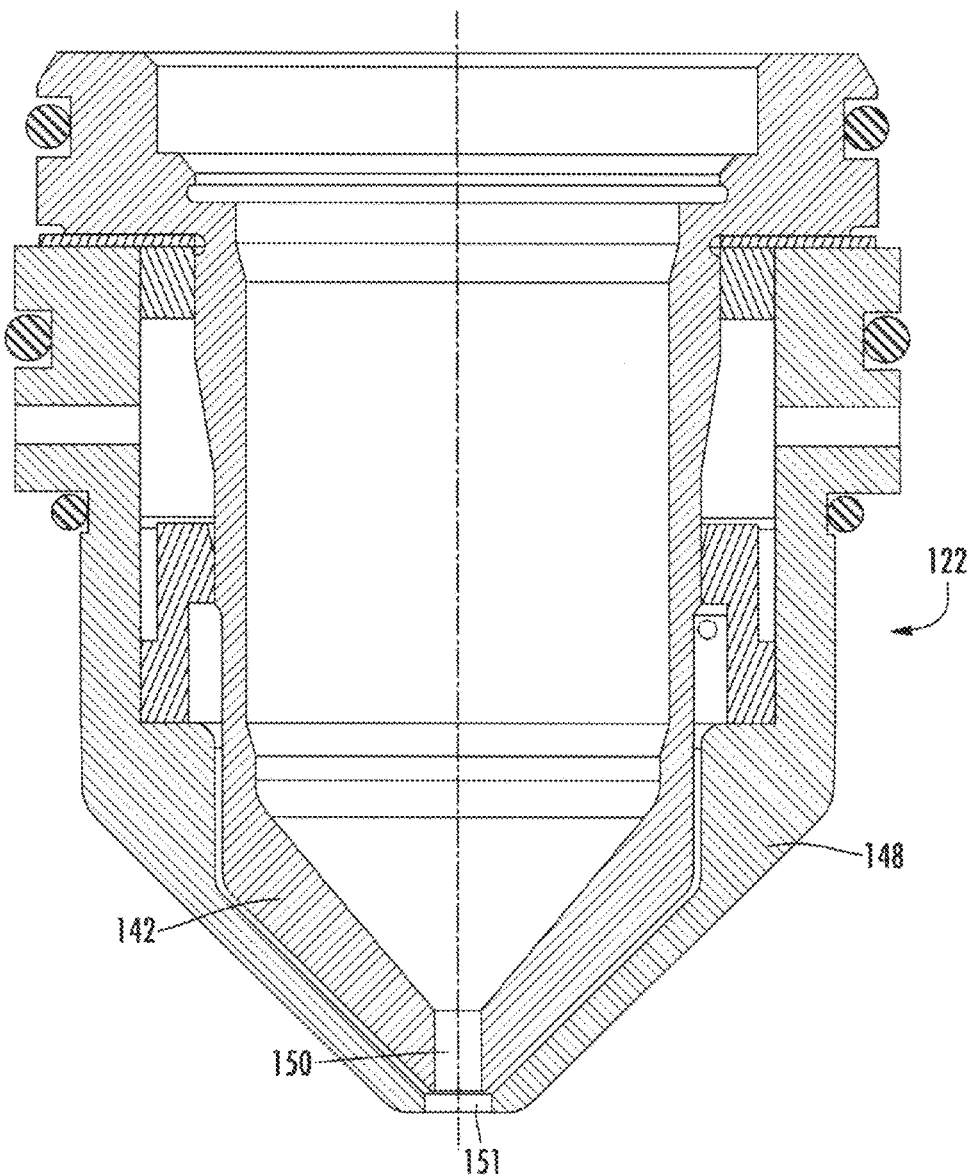
FIG. 2 is an axially sectioned side view of a nozzle assembly comprising a plasma nozzle and a liquid-injection shield cup, in accordance with an embodiment of the invention.
Figure 3:
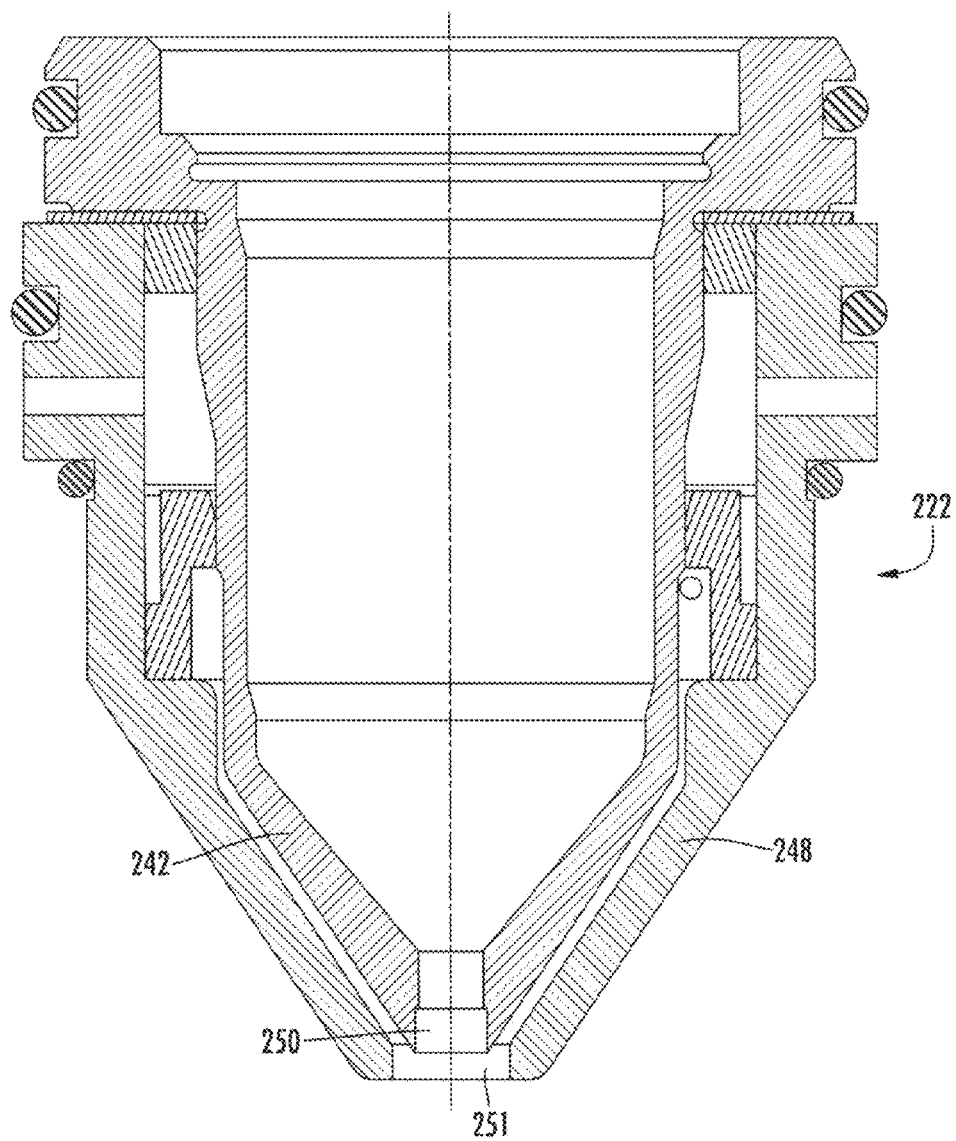
FIG. 3 is an axially sectioned side view of a nozzle assembly comprising a plasma nozzle and a liquid-injection shield cup, in accordance with another embodiment of the invention.

As noted, the present invention is not limited to the configuration of nozzle assembly 22 depicted in FIGS. 1A through 1D. FIGS. 2 and 3 depict two alternative nozzle assemblies 122 and 222, respectively, designed for different cutting current ratings from that of the nozzle assembly 22. Specifically, the nozzle assembly 22 may be designed for a relatively high cutting current rating (e.g., at or above 300 amperes, and more preferably at or above 350 amperes), while the nozzle assembly 122 may be designed for a relatively low cutting current rating (e.g., below 200 amperes, and more preferably below 150 amperes). The nozzle assembly 222 may be designed for an intermediate cutting current rating (e.g., at or above 200 amperes but below 300 amperes). It will be noted that the nozzle assemblies differ from one another in a number of respects. For example, the low-current nozzle assembly 122 has the smallest-diameter plasma nozzle orifice 150 of the plasma nozzle 142, the intermediate-current nozzle assembly 222 has a somewhat larger-diameter plasma nozzle orifice 250 of the plasma nozzle 242, and the high-current nozzle assembly 22 has the largest-diameter plasma nozzle orifice 50 of the plasma nozzle 42. Additionally, the low-current and intermediate-current nozzle assemblies 122, 222 differ from the high-current nozzle assembly 22 in that their respective liquid-injection shield cups 148, 248 are configured to inject liquid inwardly in a direction oblique to the longitudinal axis, whereas the liquid-injection shield cup 48 of the high-current nozzle assembly 22 is configured to inject liquid inwardly in a direction generally perpendicular to the axis.

As noted, during the working mode (whether cutting or marking), liquid is also injected inwardly to the arc and stream of plasma gas via the tangential liquid injection orifice 114. Surprisingly, it has been found that injecting liquid in this manner during a marking operation has several unexpected but beneficial effects upon the marking operation and the characteristics of the resulting lines marked on a workpiece.

In order to compare the quality of marks made by dry plasma marking (i.e., where a shielding gas such as nitrogen or air is used for shielding the plasma gas and arc) with the quality of marks made by wet plasma marking (i.e., where liquid (usually water) is used for shielding the plasma gas and arc) in accordance with the present invention, the marking quality was quantified by five factors: (1) marking line width; (2) marking line color; (3) marking line visibility (in contrast to the original metal surface); (4) marking line surface roughness; and (5) the creation of two visibly distinct, closely spaced lines by a single pass of the torch during marking.

Four different nozzle assemblies were employed in this study: two "dry" nozzle assemblies respectively designed for cutting at 125 amperes and 400 amperes with shielding gas surrounding the arc and plasma stream (i.e., in accordance with the prior art), and two "wet" nozzle assemblies respectively designed for cutting at 125 amperes and 400 amperes with liquid injection in accordance with the present invention. The nozzle details are provided in Table 1.

TABLE 1

Key nozzle dimensions

| Current rating (A) | Shielding method | Diameter of plasma nozzle orifice (in) | Plasma nozzle throat length (in) | Electrode emitter to torch exit distance (in) | Diameter of shield orifice (in) | Shield throat length (in) |
|---|---|---|---|---|---|---|
| 125 | Dry | 0.070 | 0.176 | 0.554 | 0.161 | 0.050 |
| 125 | Wet | 0.070 | 0.128 | 0.412 | 0.100 | 0.027 |

TABLE 1-continued

Key nozzle dimensions

| Current rating (A) | Shielding method | Diameter of plasma nozzle orifice (in) | Plasma nozzle throat length (in) | Electrode emitter to torch exit distance (in) | Diameter of shield orifice (in) | Shield throat length (in) |
|---|---|---|---|---|---|---|
| 400 | Dry | 0.13 opening to 0.141 | 0.211 | 0.513 | 0.259 | 0.053 |
| 400 | Wet | 0.156 | 0.268 | 0.521 | 0.180 | 0.130 |

Procedure

The wet and dry markings were carried out on stainless steel plate, using argon as the plasma gas, and using nitrogen or air as the shield gas for dry marking, and liquid water as the shield for wet marking, respectively. The following parameters were varied for each nozzle as indicated in Table 1: (a) marking gas pressure; (b) shield gas/liquid flow rate; and (c) torch standoff distance (and consequently, marking voltage). Only marked lines with good visibility (or contrast with stainless steel plate) and smooth surfaces (with no surface roughness as an effect of plasma marking) and two visibly distinct lines were selected as having acceptable marking quality.

Experimental Data

TABLE 2

Test Results for 125A Nozzles (at Marking Current = 10 amperes)

| Shield method | Mark pressure (psi) | Plasma gas flow rate (SCFH) | Shield Flow (gpm/SCFH) | Torch standoff (in) | Voltage | Mark width (in) | Mark Color |
|---|---|---|---|---|---|---|---|
| Dry | 45 | 91 | 150 | 0.016 | 78 | 0.055 | dark brown |
| Dry | 45 | 91 | 0 | 0.010 | 78 | 0.051 | faint brown |
| Dry | 65 | 123 | 150 | 0.060 | 93 | 0.066 | dark brown |
| Dry | 65 | 122 | 0 | 0.070 | 93 | 0.060 | dark brown |
| Dry | 65 | 123 | 300 | 0.060 | 93 | 0.061 | dark brown |
| Wet | 65 | 122 | 0.5 | 0.236 | 95 | 0.041 | dark gray/blue |
| Wet | 65 | 124 | 0.4 | 0.236 | 95 | 0.049 | dark gray/blue |
| Wet | 65 | 124 | 0.3 | 0.245 | 93 | 0.047 | dark gray/blue |
| Wet | 65 | 126 | 0.2 | 0.256 | 93 | 0.049 | dark gray/blue |
| Wet | 65 | 121 | 0.5 | 0.246 | 104 | 0.039 | dark gray/blue |
| Wet | 65 | 123 | 0.4 | 0.270 | 104 | 0.042 | dark gray/blue |
| Wet | 65 | 125 | 0.3 | 0.277 | 104 | 0.045 | dark gray/blue |
| Wet | 65 | 125 | 0.2 | 0.266 | 104 | 0.045 | dark gray/blue |
| Wet | 45 | 91 | 0.5 | 0.255 | 95 | 0.039 | dark gray/blue |
| Wet | 45 | 92 | 0.4 | 0.245 | 93 | 0.036 | dark gray/blue |
| Wet | 45 | 94 | 0.3 | 0.238 | 93 | 0.043 | dark gray/blue |
| Wet | 45 | 94 | 0.2 | 0.210 | 93 | 0.035 | dark gray/blue |
| Wet | 45 | 89 | 0.5 | 0.220 | 98 | 0.040 | dark gray/blue |
| Wet | 45 | 94 | 0.2 | 0.220 | 98 | 0.033 | dark gray/blue |

TABLE 3

Test Results for 400A Nozzles (at Marking Current = 35 amperes)

| Shield method | Mark pressure (psi) | Plasma gas flow rate (SCFH) | Shield Flow (gpm/SCFH) | Torch standoff (in) | Voltage | Mark width (in) | Mark Color |
|---|---|---|---|---|---|---|---|
| Dry | 30 | 194 | 150 | 0.13 | 59 | 0.123 | Faint blue |
| Dry | 30 | 194 | 0 | 0.13 | 60 | 0.119 | Dark brown |
| Dry | 30 | 194 | 300 | 0.13 | 60 | 0.116 | Faint brown |
| Dry | 30 | 194 | 150 | 0.075 | 56 | 0.115 | Faint blue |
| Dry | 30 | 194 | 0 | 0.075 | 58 | 0.117 | Faint brown |
| Dry | 30 | 194 | 300 | 0.075 | 58 | 0.113 | Faint blue |
| Dry | 30 | 104 | 150 | 0.13 | 55 | 0.115 | Faint blue |
| Dry | 30 | 106 | 0 | 0.13 | 56 | 0.107 | Faint brown |
| Dry | 30 | 106 | 300 | 0.13 | 55 | 0.095 | Faint brown |
| Wet | 30 | 104 | 0.65 | 0.21 | 66 | 0.07 | Faint brown |
| Wet | 30 | 106 | 0.4 | 0.213 | 66 | 0.063 | Dark gray/blue |
| Wet | 30 | 102 | 0.65 | 0.2 | 71 | 0.077 | Dark gray/blue |
| Wet | 30 | 104 | 0.4 | 0.2 | 67 | 0.067 | Dark gray/blue |
| Wet | 30 | 104 | 0.4 | 0.125 | 64 | 0.066 | Faint brown |

TABLE 3-continued

Test Results for 400A Nozzles (at Marking Current = 35 amperes)

| Shield method | Mark pressure (psi) | Plasma gas flow rate (SCFH) | Shield Flow (gpm/SCFH) | Torch standoff (in) | Voltage | Mark width (in) | Mark Color |
|---|---|---|---|---|---|---|---|
| Wet | 30 | 103 | 0.65 | 0.275 | 80 | 0.101 | Dark gray/blue |
| Wet | 30 | 104 | 0.4 | 0.275 | 75 | 0.104 | Dark gray/blue |

Data Analysis

Figure 4:
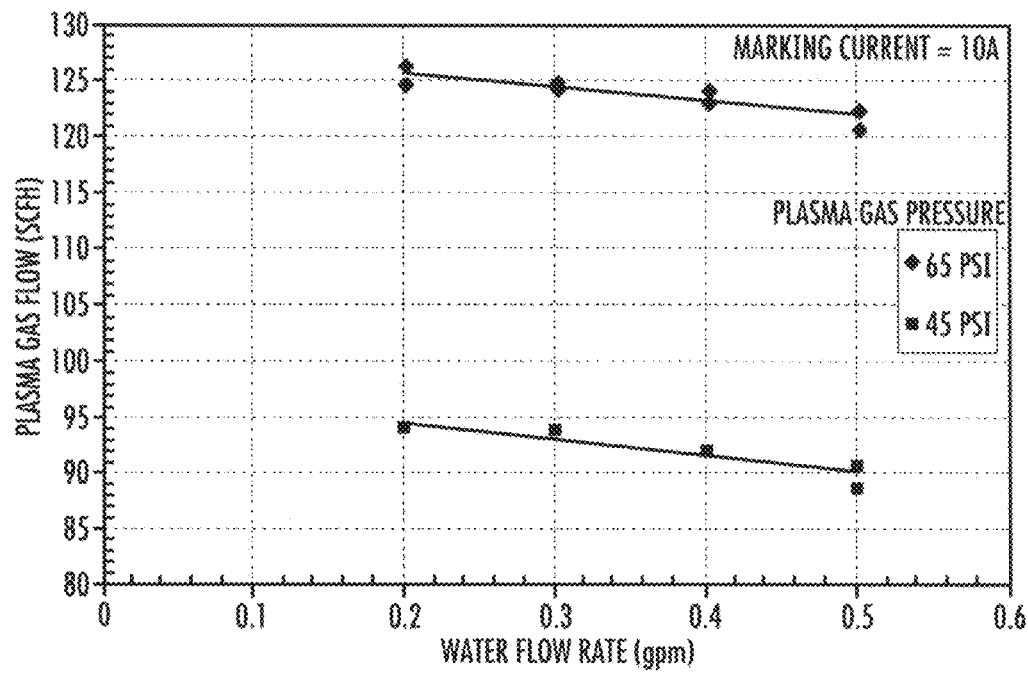
FIG. 4 is a graph showing test results of a plasma arc torch in accordance with an embodiment of the present invention, using a nozzle assembly designed for cutting at 125 amperes of arc current, depicting how plasma gas flow rate and liquid flow rate interacted for different plasma gas pressures at a marking current of 10 amperes and various standoff distances.
Figure 5:
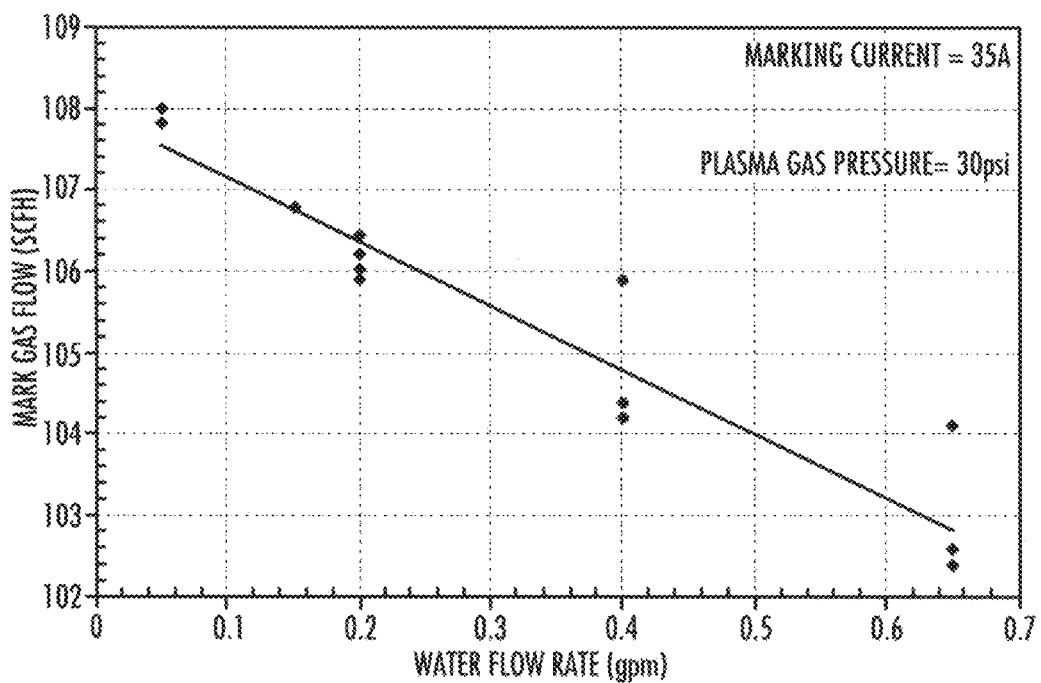
FIG. 5 is a graph showing test results of a plasma arc torch in accordance with an embodiment of the present invention, using a nozzle assembly designed for cutting at 400 amperes of arc current, depicting how plasma gas flow rate and liquid flow rate interacted at a plasma gas pressure of 30 psi and a marking current of 35 amperes at various standoff distances.

The results in Tables 2 and 3 above indicate that the plasma arc is constricted more efficiently in the liquid injection marking process than in the dry marking process. This can be deduced from the following considerations. In the case of a constant-pressure system, the flow can be reduced only by creating more restriction to the flow. As the liquid flow rate increases, the plasma gas flow rate decreases as shown in FIG. 4 for 65 psi and 45 psi constant-pressure systems with the 125A nozzles. This indicates that the plasma arc column is constricted because of higher liquid flow. This effect was not observed in the dry plasma marking process, where the plasma gas flow rate remained practically unchanged for various shield gas flow rates as shown in Table 2 above. A similar trend was observed with the 400A wet and dry nozzles, as shown in FIG. 5.

Table 4 below shows the magnitude of force contributing to arc squeezing action in dry and wet marking processes with the 125A and 400A wet and dry nozzles.

TABLE 4

Calculation of squeezing force for dry and wet marking processes

| Current rating (A) | Shielding method | Liquid/gas flow exit area (in²) | Rated shield flow rate (gpm or SCFH) | Shield mass flow rate (kg/s) | Force at exit (Newtons) | Component of force contributing to arc squeezing action (Newtons) |
|---|---|---|---|---|---|---|
| 125 | Dry | 0.025 | 71 | 0.0007 | 0.025 | 0.006 |
| 125 | Wet | 0.003 | 0.4 | 0.0252 | 0.362 | 0.096 |
| 400 | Dry | 0.025 | 140 | 0.0014 | 0.096 | 0.014 |
| 400 | Wet | 0.010 | 0.5 | 0.0315 | 0.152 | 0.057 |

The test results also show that liquid injection plasma marking can mark a distinct line with a wide variety of process parameters as compared with dry plasma marking. The wet-marked line width was significantly less than the dry-marked line width. Specifically, with the 125A nozzles, the average wet-marked line width was 0.042±0.005 inch, versus 0.059±0.006 inch for the dry-marked line width. With the 400A nozzles, the average wet-marked line width was 0.078±0.008 inch, versus 0.113±0.017 inch for the dry-marked line width.

The test results in Tables 2 and 3 also indicate that wet plasma marking can mark much darker (higher-contrast) lines than dry plasma marking. In particular, lines marked by wet marking tended to be dark blue or dark gray, whereas dry-marked lines tended to be brown or light blue. Table 5 below shows data for heat tint of stainless steel at various temperatures. The dark blue/gray colored wet-marked lines indicate localized surface temperatures of 540 to 600° C., whereas the brown colored dry-marked lines indicate localized temperatures of 390 to 450° C. The higher contrast of the wet-marked lines relative to the dry-marked lines should result in the wet-marked lines having a longer life.

TABLE 5

Tint colors of stainless steel

| Color Formed | Approx. Temperature ° C. |
|---|---|
| pale yellow | 290 |
| straw yellow | 340 |
| dark yellow | 370 |
| brown | 390 |
| purple brown | 420 |
| dark purple | 450 |
| blue | 540 |
| dark blue | 600 |

It was further found in the tests that the heat-affected zone was substantially reduced in wet plasma marking compared to dry plasma marking. Specifically, stainless steel plates were marked with a series of spaced parallel lines, using both wet marking and dry marking processes. The plates marked via the dry marking process tended to become curled (nonplanar) as a result of deformation of the material in the heat-affected zones. The plates marked via the wet marking process tended to remain substantially planar.

The testing also revealed that wet plasma marking has more ease of use than the dry marking process. In particular, it was found that the standoff distance (torch to plate distance) was substantially larger in wet marking than in dry marking. The average standoff distance for wet marking was about 0.244±0.019 inch, versus 0.043±0.028 inch for dry marking, at voltage levels that provided acceptable marking quality. The advantage of the larger standoff distance is that the chances of the torch colliding with the plate, especially in the case of plates having non-flat or irregular surfaces, are greatly reduced, thereby improving shield and other consumable life.

Figure 6:
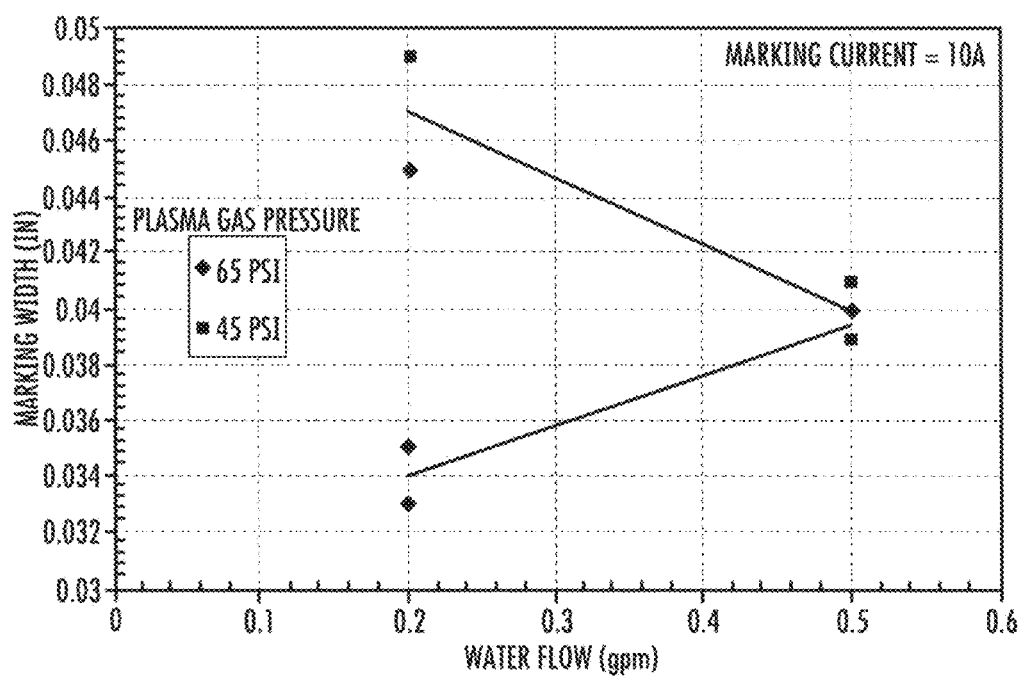
FIG. 6 is a graph showing test results of a plasma arc torch in accordance with an embodiment of the present invention, using a nozzle assembly designed for cutting at 125 amperes of arc current, depicting how marking line width varied as a function of plasma gas pressure and liquid flow rate.

Additionally, it was found that a lower plasma gas flow rate and lower plasma gas pressure can be employed with wet marking versus drying marking, to achieve similar mark quality (per the above-noted 5-point definition). Moreover, marked line width can be controlled by varying the liquid flow rate, whereas there is little or no control over line width in dry marking. Specifically, as shown in FIG. 6, liquid flow rate significantly interacted with gas pressure (or flow rate) to allow varying the marking line width in the wet marking process, employing the 125A nozzle assemblies. At a plasma gas pressure of 45 psi, liquid flow rate had a significant effect on the marking width; line width varied from 0.034±0.001 inch at a liquid flow rate of 0.2 gpm, to 0.040±0.001 inch at a liquid flow rate of 0.5 gpm. This effect diminished as the plasma gas pressure was increased, and at a plasma gas pressure of 65 psi, the trend actually reversed, such that at a 0.2 gpm liquid flow rate the line width was 0.047±0.003 inch for low liquid flow rate, versus 0.040±0.001 inch at a liquid flow rate of 0.5 gpm. Thus, at low plasma gas pressure, marking line width was directly proportional to the liquid flow rate, while at high plasma gas pressure the line width was inversely proportional to the liquid flow rate.

This behavior was not observed in the dry plasma marking process. The plasma gas pressure/flow was a significant factor for the marking line width in the dry plasma process (yielding average line widths of 0.053 in at 45 psi and 0.063 inch at 65 psi plasma gas pressure), but the marking line width was not affected by the shield gas flow rate nearly as much as it was affected by liquid flow rate in the wet marking process. Line width remained essentially constant over a wide range of shield gas flow rates (yielding a line width of 0.051 inch with zero shield gas flow rate and 0.055 inch at a 300 scfh shield gas flow rate at 45 psi plasma gas pressure; line width varied from 0.060 inch at zero shield gas flow rate, to 0.066 inch at a 300 scfh shield gas flow rate at 65 psi plasma gas pressure).

The wet marking process showed similar trends with the 400A nozzle assemblies. As shown in FIG. 7, at a 30 psi plasma gas pressure, the marking line width was directly proportional to the liquid flow rate. There was no significant variation of marking line width using the dry plasma marking process with various shield gas flow rates.

A further unexpected but advantageous outcome of wet marking, as previously noted, was the creation of two visibly distinct, closely spaced lines with a single pass of the torch during a marking operation. This is depicted in FIG. 8, showing a magnified photograph of a stainless steel plate marked in a single pass by a wet-marking process in accordance with the present invention. It can be seen that the mark comprises two distinct, closely spaced parallel lines of one color, separated by an intervening region of a substantially different color. The precise mechanism responsible for this characteristic is not well understood. It may be a result of liquid covering the arc and therefore changing the temperature distribution around the periphery of the arc. It is also possible that partial ionization of liquid forms oxygen and hydrogen plasma on the periphery of the arc. Since $H_2$ has a relatively higher electrical conductivity at elevated temperature (after the avalanche breakdown point is passed) compared to that of argon, it is possible that the periphery of the plasma plume is heated more (by Joules/resistive heating) than is the core of the plume. This highly heated region of hydrogen plasma along the periphery of the plasma plume may produce a dark blue tint or contrast on the steel, while a relatively fainter mark is produced by the lower-temperature argon plasma located in the core of the plasma plume. In some marking applications, it can be advantageous to make two-line marks such as shown in FIG. 8. For example, a two-line mark can be beneficial as an alignment mark (e.g., a welding alignment mark) because the presence of the two distinct lines leaves less ambiguity as to where the center (in the line thickness direction) of the alignment mark is located. By suitably selecting the process parameters, two-line marks can be produced for such applications. In particular, the plasma gas pressure, liquid flow rate, marking current, and torch standoff distance can be selectively regulated to control the quality of the mark produced by wet marking in accordance with the invention.

In other applications, it may be desirable to produce a mark that is a continuous essentially monochromatic region from one edge to the other edge of the mark. Such "one-line" marks can also be produced by wet-marking in accordance with the invention, by suitably selecting the process parameters as noted above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of operating a plasma arc torch to selectively cut, as well as form markings on surfaces of, metal workpieces without having to change any consumables of the torch, the method comprising the steps of:
   (1) providing a plasma arc torch comprising
      (a) a torch body defining a longitudinal axis,
      (b) an electrode mounted to the torch body along the longitudinal axis and defining a front discharge end supporting an emissive element operable for emitting an electrical arc,
      (c) a plasma nozzle mounted on the torch body to overlie the front discharge end of the electrode and so as to define a plasma cavity therebetween, said plasma nozzle including a front wall having a plasma nozzle orifice extending therethrough and aligned with the electrode along the longitudinal axis, such that an arc emitted from the emissive element can pass through the plasma nozzle orifice along with a stream of plasma gas,
      (d) a liquid-injection shield cup mounted to the torch body so as to overlie in spaced relation the front wall of the plasma nozzle and define an annular liquid chamber between the liquid-injection shield cup and the plasma nozzle, the liquid-injection shield cup including a front wall having an axial liquid injection orifice extending therethrough and aligned with the electrode along the longitudinal axis such that the arc and stream of plasma gas issuing from the plasma nozzle orifice pass through the axial liquid injection orifice and toward a workpiece adjacent the front wall of the liquid-injection shield cup, the liquid-injection shield cup and the plasma nozzle being structured and arranged so as to cooperatively define a tangential liquid injection orifice that is generally annular and coaxially surrounds the arc and stream of plasma gas issuing from the plasma nozzle orifice of the plasma nozzle and injects liquid from the annular liquid chamber tangentially inwardly to the arc and stream of plasma gas and then through the axial liquid injection orifice toward the workpiece, (e) a plasma gas passage extending through the torch body and to the plasma cavity, and (f) a liquid injection passage extending through the torch body and to the annular liquid chamber;

(2) marking the workpiece by delivering a plasma marking gas to the plasma gas passage and thus to the plasma cavity, delivering liquid to the liquid injection passage and thus to the annular liquid chamber, and delivering electrical power to the electrode at a relatively low power level that is suitable for plasma marking of the workpiece, such that a relatively low-current arc is directed, along with a stream of plasma marking gas and the liquid, out from the axial liquid injection orifice toward the workpiece; and (3) cutting the workpiece, or another workpiece, by delivering a plasma cutting gas to the plasma gas passage and thus to the plasma cavity, delivering liquid to the liquid injection passage and thus to the annular liquid chamber, and delivering electrical power to the electrode at a relatively high power level that is suitable for plasma cutting of the workpiece, such that a relatively high-current arc is directed, along with a stream of plasma cutting gas and the liquid, out from the axial liquid injection orifice toward the workpiece.

2. The method of claim 1, wherein steps (2) and (3) respectively comprise delivering a gas of a first composition to the plasma gas passage for marking, and delivering a gas of a second composition different from the first composition to the plasma gas passage for cutting.

3. The method of claim 1, wherein step (2) comprises delivering electrical current not greater than about 50 amperes to the electrode for marking, and step (3) comprises delivering electrical current greater than that used in step (2) to the electrode for cutting.

4. The method of claim 1, wherein the liquid is injected by the tangential liquid injection orifice inwardly to the arc and stream of plasma gas along a direction substantially perpendicular to the longitudinal axis, by virtue of the configuration of the plasma nozzle and the liquid-injection shield cup.

5. The method of claim 1, wherein the liquid is injected by the tangential liquid injection orifice inwardly to the arc and stream of plasma gas along a direction oblique to the longitudinal axis so as to form a cone of injection liquid directed inwardly, by virtue of the configuration of the plasma nozzle and the liquid-injection shield cup.

6. The method of claim 5, wherein said cone has a half angle of approximately 1° to 80°.

7. The method of claim 1, wherein the liquid is delivered to the liquid injection passage at a regulated volumetric flow rate.

8. The method of claim 1, wherein steps (1) through (3) are performed to mark a workpiece at an arc current less than or equal to about 50 amperes and to cut the workpiece, or another workpiece, at an arc current equal to or greater than about 70 amperes but less than 200 amperes, and further comprising the steps of:

replacing the plasma nozzle and the liquid-injection shield cup with a differently configured second plasma nozzle and a differently configured second liquid-injection shield cup, and performing steps (2) and (3) to mark a workpiece at an arc current less than or equal to about 50 amperes and to cut the workpiece, or another workpiece, at an arc current equal to or greater than 200 amperes but less than 300 amperes.

9. The method of claim 8, further comprising the steps of:

replacing the second plasma nozzle and the second liquid-injection shield cup with a still differently configured third plasma nozzle and a still differently configured third liquid-injection shield cup, and performing steps (2) and (3) to mark a workpiece at an arc current less than or equal to about 50 amperes and to cut the workpiece, or another workpiece, at an arc current equal to or greater than 300 amperes.

10. A plasma arc torch system for both cutting and marking of workpieces, comprising:

a torch body defining a longitudinal axis;

an electrode mounted to the torch body along the longitudinal axis and defining a front discharge end supporting an emissive element operable for emitting an electrical arc;

a plasma nozzle mounted on the torch body to overlie the front discharge end of the electrode and so as to define a plasma cavity therebetween, said plasma nozzle including a front wall having a plasma nozzle orifice extending therethrough and aligned with the electrode along the longitudinal axis, such that an arc emitted from the emissive element can pass through the plasma nozzle orifice along with a stream of plasma gas;

a liquid-injection shield cup mounted to the torch body so as to overlie in spaced relation the front wall of the plasma nozzle and define an annular liquid chamber between the liquid-injection shield cup and the plasma nozzle, the liquid-injection shield cup including a front wall having an axial liquid injection orifice extending therethrough and aligned with the electrode along the longitudinal axis such that the arc and stream of plasma gas issuing from the plasma nozzle orifice pass through the axial liquid injection orifice and toward a workpiece adjacent the front wall of the liquid-injection shield cup, the liquid-injection shield cup and the plasma nozzle being structured and arranged so as to cooperatively define a tangential liquid injection orifice that is generally annular and coaxially surrounds the arc and stream of plasma gas issuing from the plasma nozzle orifice of the plasma nozzle and injects liquid from the annular liquid chamber tangentially inwardly to the arc and stream of plasma gas and then through the axial liquid injection orifice toward the workpiece;

a plasma gas passage extending through the torch body and to the plasma cavity;

a liquid injection passage extending through the torch body and to the annular liquid chamber;

an injection liquid control for supplying a flow of liquid at a regulated volumetric flow rate to the liquid injection passage and thus to the liquid chamber, the injection liquid control being operable to selectively vary the regulated volumetric flow rate of the liquid; and a power supply operable to selectively deliver electrical power to the electrode at either (1) a relatively low power level that is suitable for plasma marking of a workpiece or (2) a relatively high power level that is suitable for workpiece cutting;

whereby the torch may be selectively operated (1) at the relatively low power level, with a plasma marking gas being delivered to the plasma gas passage, and liquid being delivered to the liquid injection passage, to permit operation in a workpiece marking mode, or (2) at the relatively high power level, with a plasma cutting gas being delivered to the plasma gas passage, and liquid being delivered to the liquid injection passage, to permit operation in a workpiece cutting mode.

11. The plasma arc torch system of claim 10, further comprising a gas control operable for selectively delivering a plasma marking gas to the plasma gas passage for marking and delivering a plasma cutting gas to the plasma gas passage for cutting.

12. The plasma arc torch system of claim 10, wherein the front wall of the plasma nozzle and the front wall of the liquid-injection shield cup are configured so as to define the tangential liquid injection orifice as a generally conical orifice that injects a cone of liquid inwardly to the arc and stream of plasma gas along a direction oblique to the longitudinal axis.

13. The plasma arc torch system of claim 12, wherein the tangential liquid injection orifice is configured such that the cone of liquid has a cone half angle of about 1° to 80°.

14. The plasma arc torch system of claim 10, wherein in the region of the tangential liquid injection orifice the front wall of the plasma nozzle and the front wall of the liquid-injection shield cup extend radially inwardly along a direction generally perpendicular to the longitudinal axis such that the liquid is injected inwardly to the arc and stream of plasma gas along a direction generally perpendicular to the longitudinal axis.

15. The plasma arc torch system of claim 10, wherein the plasma nozzle orifice of the plasma nozzle is relatively small in diameter, suitable for cutting at a relatively low first range of arc current, and wherein the system further comprises:

a second plasma nozzle and a second liquid-injection shield cup configured to be installed in the plasma arc torch system in replacement of the plasma nozzle and the liquid-injection shield cup, wherein the second plasma nozzle has a plasma nozzle orifice larger in diameter than the plasma nozzle orifice of the plasma nozzle, the second plasma nozzle and the second liquid-injection shield cup being suitable for cutting at a second range of arc current that is higher than said first range of arc current;

the second plasma nozzle and the second liquid-injection shield cup enabling the plasma arc torch system to mark a workpiece at an arc current lower than said first range of arc current.

16. The plasma arc torch system of claim 15, further comprising:

a third plasma nozzle and a third liquid-injection shield cup configured to be installed in the plasma arc torch system in replacement of the plasma nozzle and the liquid-injection shield cup, wherein the third plasma nozzle has a plasma nozzle orifice larger in diameter than the plasma nozzle orifice of the second plasma nozzle, the third plasma nozzle and the third liquid-injection shield cup being suitable for cutting at a third range of arc current that is higher than said second range of arc current;

the third plasma nozzle and the third liquid-injection shield cup enabling the plasma arc torch system to mark a workpiece at an arc current lower than said first range of arc current.

* * * * *